United States Patent [19]
Allgeyer et al.

[11] 3,757,704
[45] Sept. 11, 1973

[54] PALLET

[75] Inventors: Guy H. Allgeyer; James B. Foote, both of Toledo, Ohio

[73] Assignee: Owens-Illinois, Inc., Toledo, Ohio

[22] Filed: June 21, 1972

[21] Appl. No.: 264,845

Related U.S. Application Data

[60] Division of Ser. No. 140,575, May 5, 1970, Pat. No. 3,699,902, which is a continuation of Ser. No. 867,589, Oct. 20, 1969, abandoned.

[52] U.S. Cl. .................................. 108/51, 108/58
[51] Int. Cl. ...................... B65d 19/00, B65d 19/38
[58] Field of Search ............................. 108/51–58

[56] References Cited
UNITED STATES PATENTS
3,407,758  10/1968  Simkins ............................... 108/51
3,404,642  10/1968  Belcher et al. ....................... 108/51
3,467,032   9/1969  Rowlands et al. .................... 108/51
2,908,464  10/1959  Traudt et al. ........................ 108/56
2,930,560   3/1960  Carnwath et al. .................... 108/56
3,187,689   6/1965  Hess .................................... 108/58

Primary Examiner—Paul R. Gilliam
Attorney—E. F. Dwyer et al.

[57] ABSTRACT

A pallet is provided for supporting loads thereon. The pallet includes an upper member formed of thermoplastic material for receiving loads thereon, a plurality of rows of supporting elements for supporting said upper member in an elevated position to permit the entry of lifting forks thereunder, and a reinforcing member positioned between the supporting elements and the upper sheet to bridge a load positioned on the upper sheet between the respective supporting elements. The reinforcing member has spaced apart upper and lower portions which are interconnected together to permit the reinforcing member to function as a flexural member.

4 Claims, 13 Drawing Figures

Patented Sept. 11, 1973

Patented Sept. 11, 1973

PALLET

CROSS-REFERENCE TO RELATED APPLICATION

This application is a division of application Ser. No. 140,575, filed May 5, 1971 now U.S. Pat. No. 3,699,902, issued Oct. 24, 1972, which is a continuation of application Ser. No. 867,589, filed Oct. 20, 1969, now abandoned.

BACKGROUND OF THE INVENTION

It has long been the desire of industry to have at its disposal a pallet which would meet as many of the desired characteristics as possible. These characteristics include light weight, lost cost, freedom from maintenance, and the ability to withstand the required loads.

Wooden pallets, which have been most prevalent heretofore, meet the criteria of low initial cost and ability to withstand the required loads, but do not meet the criteria of freedom from maintenance and light weight.

Other pallets which have been proposed, while being satisfactory for some specific purpose, have not met all of the criteria to an extent which caused them to gain widespread acceptance.

The present invention provides a pallet which is reasonably economical to form, which requires no maintenance, which is strong enough to meet normal loading requirements and which is sufficiently light that it can be readily handled by one person.

It is an object of the present invention to provide a new and novel pallet.

It is a further object of the present invention to provide a pallet which is economical to form, which has light weight and which is free from maintenance once put into use.

It is an additional object of the present invention to provide a pallet which incorporates a plurality of elements formed from various materials to provide a pallet which is structurally strong and yet which is light enough in weight to be handled by one person.

Other objects and advantages of the present invention will be readily apparent from the following description taken in conjunction with the annexed sheets of drawings on which:

Figure 1:
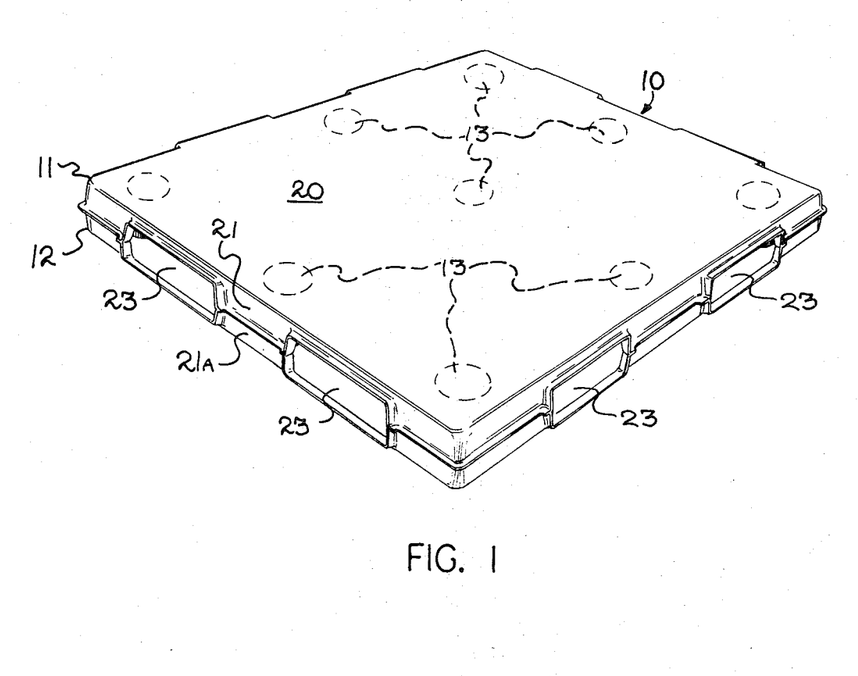
FIG. 1 is a perspective view of the pallet of the present invention.
Figure 2:
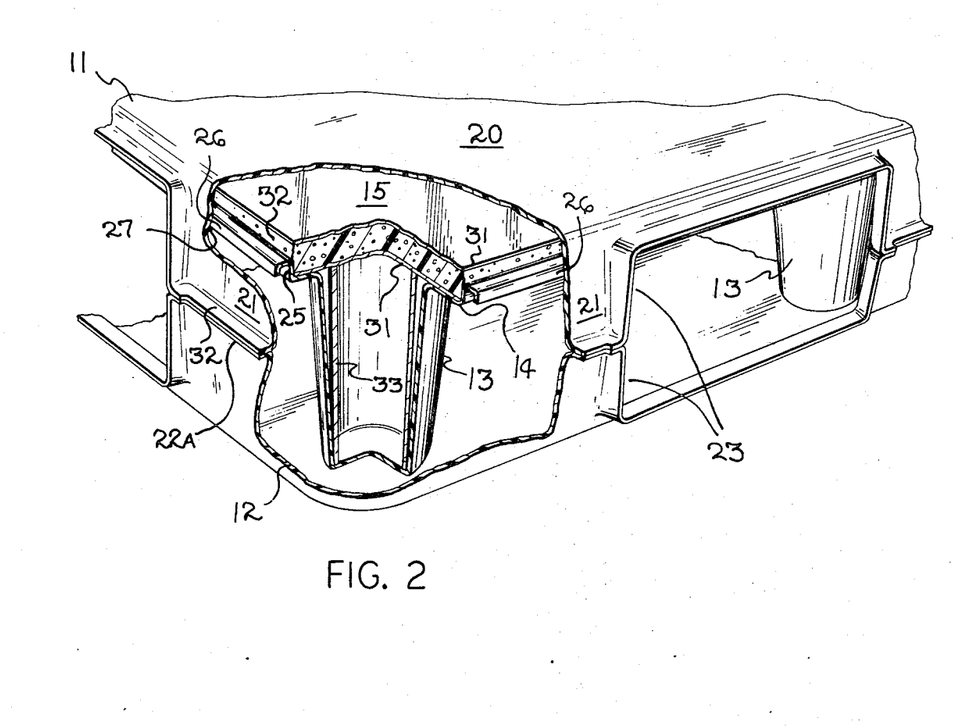
FIG. 2 is an enlarged fragmentary perspective view partly in section showing one corner of the pallet illustrated in FIG. 1.
Figure 3:
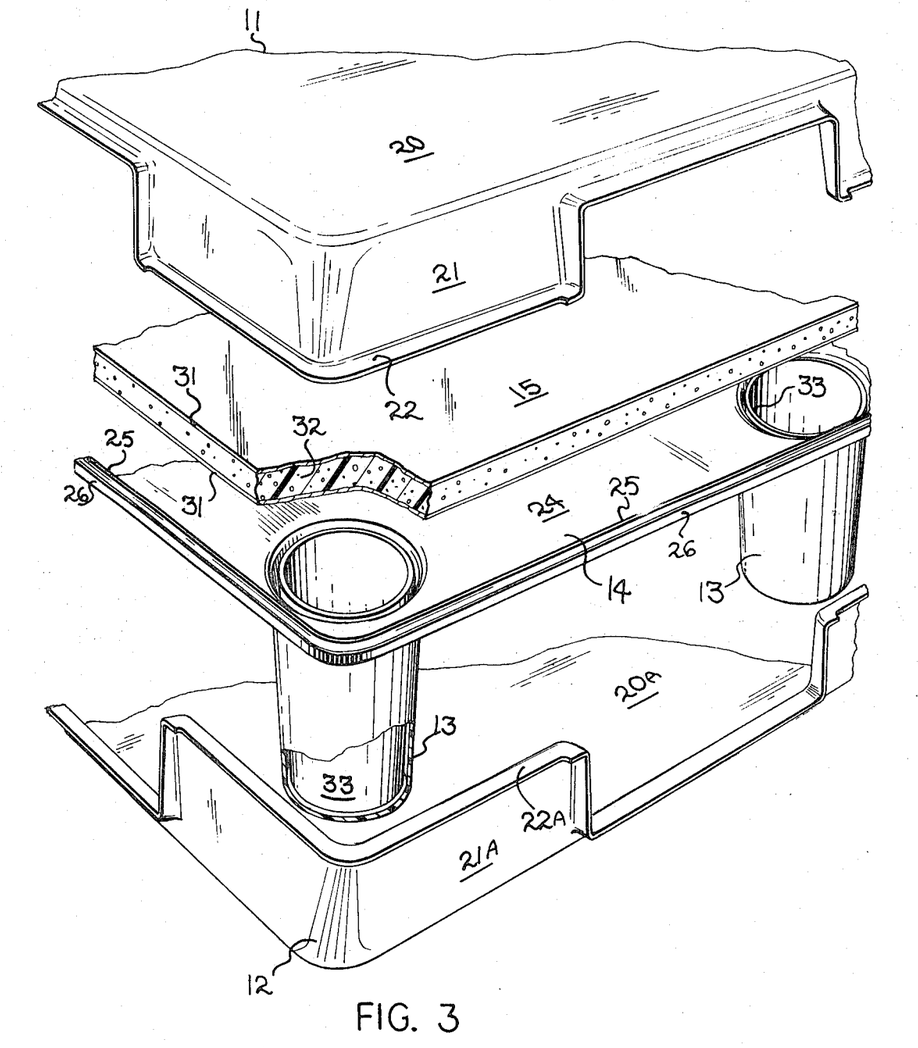
FIG. 3 is an exploded view of the fragmentary corner shown in FIG. 2.
Figure 4:
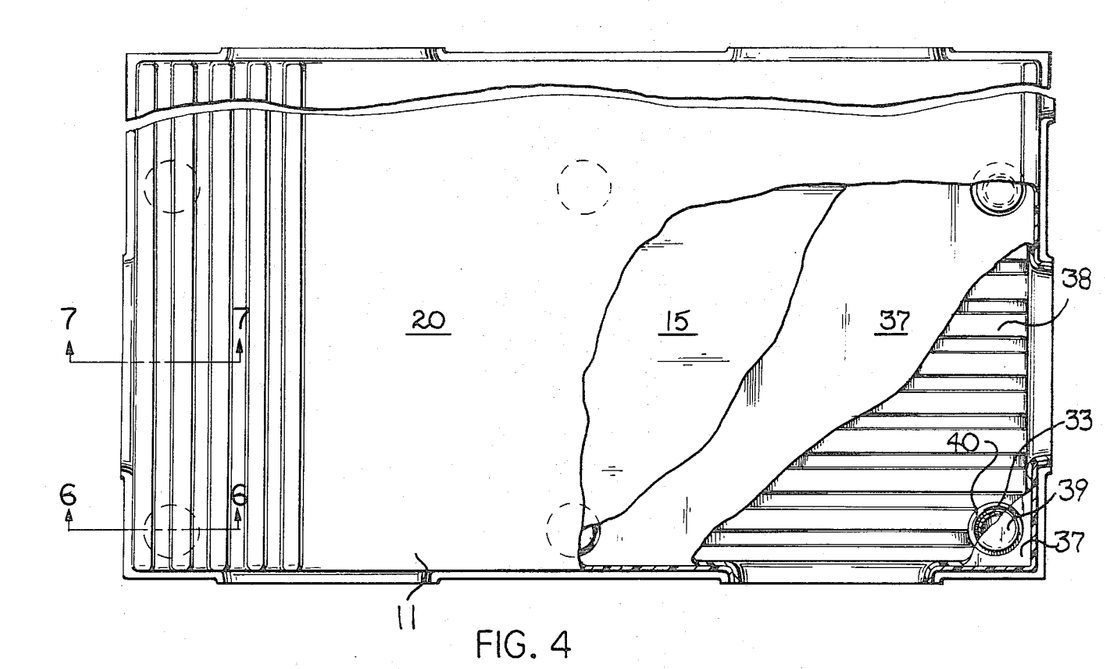
FIG. 4 is a top plan view of a modified pallet.
Figure 5:
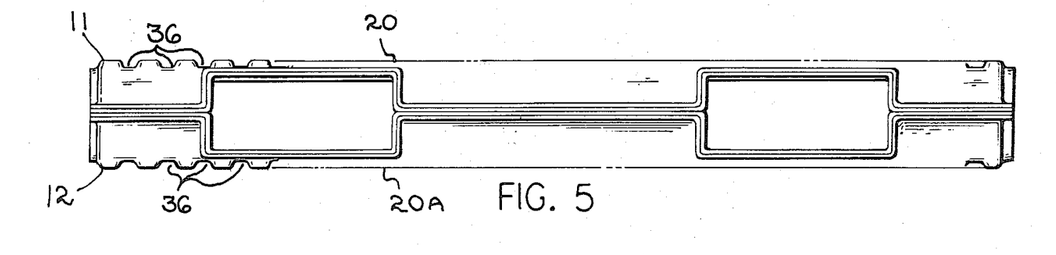
FIG. 5 is an elevational view of the pallet shown in FIG. 4.
Figure 6:
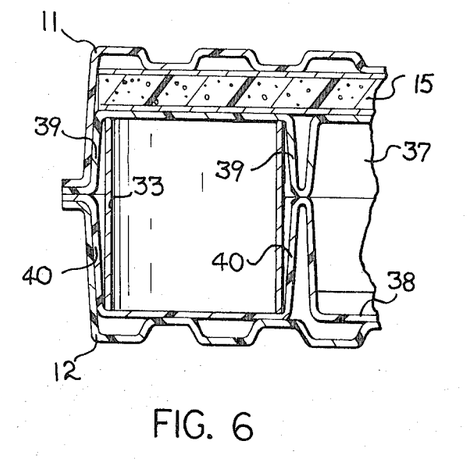
FIG. 6 is a sectional view taken through line 6—6 of FIG. 4.
Figure 7:
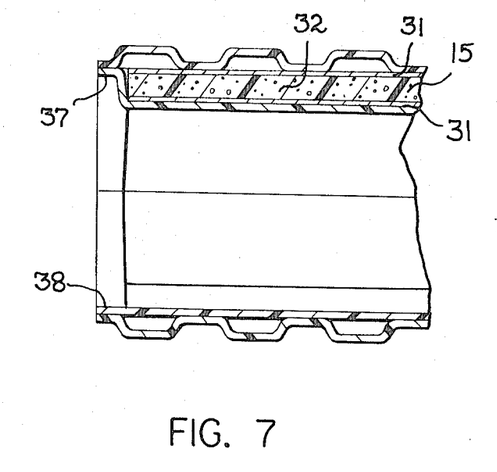
FIG. 7 is a sectional view taken through line 7—7 of FIG. 4.

Referring now to FIGS. 1–3, there is provided a pallet generally designated by the numeral 10. The pallet 10 includes upper and lower members 11 and 12 formed of thermoplastic material, a plurality of supporting elements 13 formed integrally with an intermediate member 14 of thermoplastic material and a reinforcing member 15 between the upper member 11 and the supporting elements 13. As can be seen from the drawings, the supporting elements 13 are arranged in rows with spaces therebetween to permit the entry of lifting forks therebetween.

The upper member includes a panel portion 20 for receiving loads thereon and integrally formed downwardly extending peripheral edge portions 21. A flange 22 extends outwardly from the peripheral edge portion 21.

In the embodiment of the invention illustrated in FIGS. 1–3, the lower member 12 is substantially identical to the upper member 11 and includes a panel portion 20A and an integrally formed upwardly extending peripheral edge portion 21A from which a flange 22A extends. The respective flanges 22 and 22A are sealed together as by heat sealing or by a suitable adhesive such as commercially available hot melts. The peripheral edge portions 21 and 21A have openings 23 formed therein to permit the entry of lifting forks. As such, the openings 23 are aligned between the rows of supporting elements 13.

The intermediate member 14 has a major planar portion 24 from which the supporting elements 13 depend. The supporting elements 13 function as columns in transmitting a load placed on the panel portion 20 of the upper member 11 to the ground or other support on which the lower member 12 is resting. Such supporting elements 13 may be molded in the intermediate member 14 by any conventional molding process such as by vacuum forming or injection molding. The major planar portion 24 terminates at its periphery in an upwardly extending flange 25 having a U-shaped curled edge 26. The intermediate member 14 is positioned within the enclosure formed by the upper and lower members 11 and 12 with the supporting elements 13 resting upon the panel portion 20A of the lower member. Preferably, the curled edge 26 thereof fits snugly within the peripheral edge portion 21 of the upper member 11. If desired, it may be heat sealed to such peripheral edge portion 21 as indicated.

Positioned between the upper surface of the major planar portion 24 and the lower surface of the panel portion 20 is the reinforcing member 15. The reinforcing member 15 comprises a pair of thin facing sheets 31, on the order of ten to fifty thousandths inches (0.010–0.050) thick separated by a filler element 32. Although the thickness of the filler element 32 may be varied depending upon the loading characteristics desired for the pallet, a filler element one inch thick has proven to be very satisfactory. The filler element 32 functions primarily to hold the two facing sheets in spaced relationship and to hold them against slippage. Accordingly, the facing sheets 31 are adhesively bonded to the filler 32. The filler 32 may be formed of foamed plastic, wood, stacked corrugated board or other material to which the facing sheets may be adhered. Thus, the filler member need not have any particular tensile strength characteristics but must be able to withstand the compressive loads placed on the panel portion 20 and must have sufficient shear rigidity to transmit the bending induced shear load between the respective facing sheets 31. Thus, the reinforcing member acts as a flexural member in transmitting loads to the respective supporting elements 13. Although steel is preferred as the material for the facing sheets by virtue of its relatively high strength, any material having sufficiently high tensile strength and Young's modulus to permit the use as a structural member may be utilized. For example, laminated plastic or bonded wood fiber sheet such as that sold under the trademark "Masonite" may be used. Thus, any material having a tensile strength in excess of about 8,000 pounds per square inch with a Young's modulus in excess of about 850,000 pounds per square inch may be used. As will be appreciated, sheets having high tensile strength separated by and bonded to a filler 32 of a low tensile strength material functions as a flexural member.

If desired, additional strength may be provided by positioning sleeve member 33 within the supporting elements 13. As may be seen from the drawings, the sleeve members extend from the lower end of the supporting elements to a position flush with the top of the major planar portion 24 and serve to assist in transmitting the load received from the reinforcing member 15 to the support on which the lower panel portion 20A rests. The sleeve member may be formed of any material capable of supporting compressive loads. For example, sleeves formed of fiberboard have proven to be very satisfactory as well as economical; however, sleeves formed of metal or other materials would also be satisfactory.

Referring now to FIGS. 4-7, there is illustrated a modified pallet formed from four rather than three sheets of thermoplastic material. As can be seen from the drawings, the modified pallet utilizes upper and lower members 11 and 12 similar to those of the previous embodiment. The panel portions 20 and 20A of such members are illustrated as having recessed areas 36 which serve as an anti-skid feature. The recessed areas 36 may be formed in any desired pattern. It will be appreciated that such anti-skid feature may also be provided in the embodiment of FIGS. 1-3; however, in the interest of clarity, it has not been illustrated in that embodiment.

In the embodiment of FIGS. 4-7, there are provided a pair of intermediate members 37 and 38, each of which has formed therein cup-shaped pockets 39 and 40 which are aligned with one another. The intermediate members 37 and 38 are joined together so that the respective pockets 39 and 40 cooperate to function as columns or supporting elements similar to the supporting elements 13 of the previous embodiment. As in the previous embodiment, such supporting elements are arranged in rows to permit the entry of lifting forks therebetween. Additionally, a sleeve member 33 may be positioned within each pair of cooperating pockets to provide additional reinforcing.

Similarly, as in the previous embodiment, a reinforcing member 15 is positioned between the panel portion 20 of the upper member 11 and the upper surface of the intermediate member 37. As may be seen from the drawings, the sleeve members 33 are completely enclosed in the sealed pockets of the respective intermediate members 37 and 38. Additionally, the reinforcing member 15 is completely enclosed within sealed members. Accordingly, they are comletely protected from moisture or other damaging elements. The intermediate members may either be smooth as illustrated for the member 37 or corrugated as illustrated for the member 38.

Figure 8:
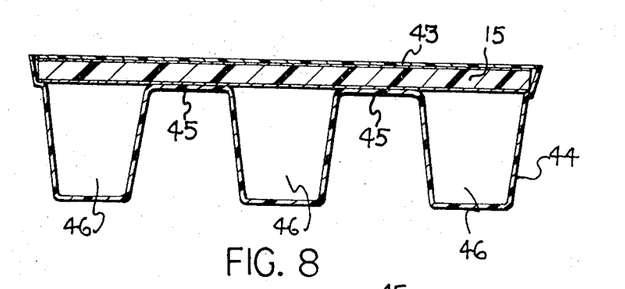
FIG. 8 is a sectional view taken through line 8—8 of FIG. 9 of a further modified pallet.
Figure 9:
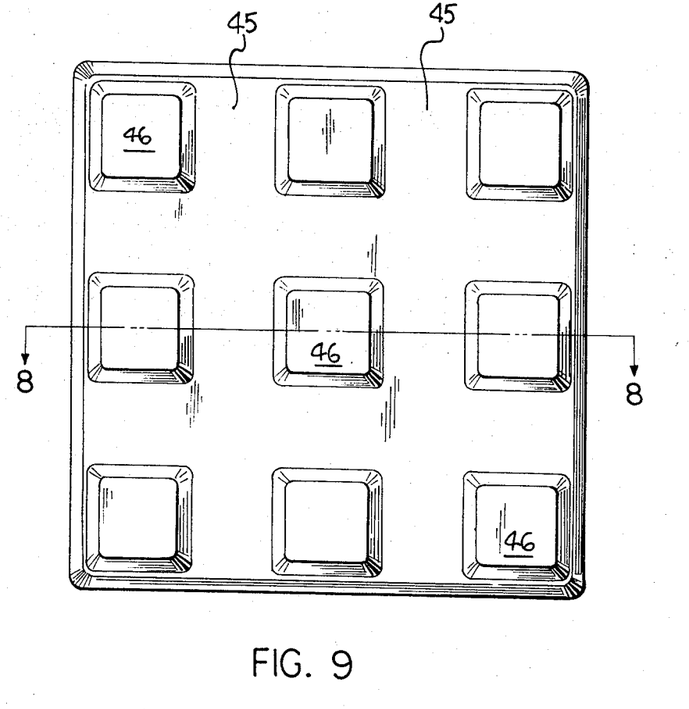
FIG. 9 is a bottom view of the pallet shown in FIG. 8.
Figure 10:
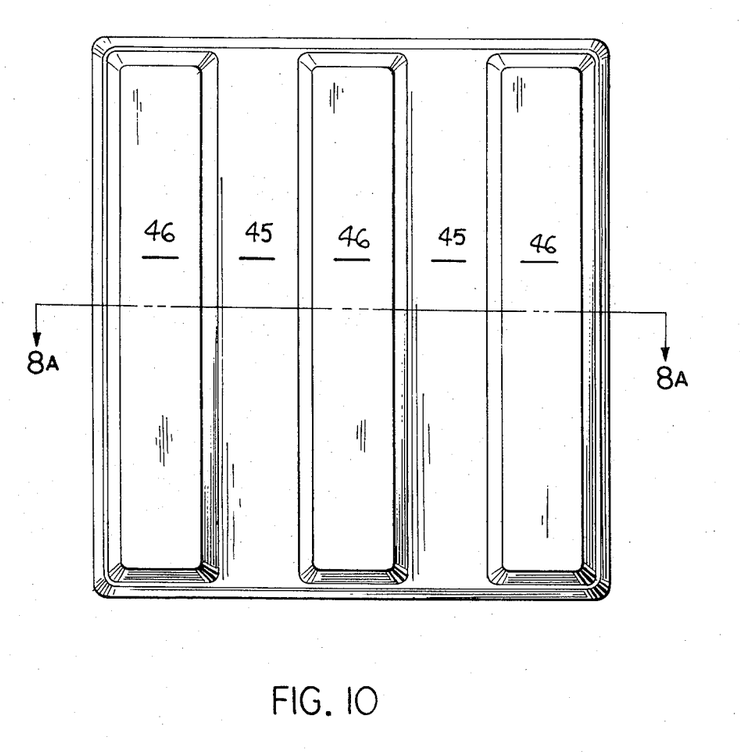
FIG. 10 is a bottom view of a pallet similar to that shown in FIG. 9 but having a further modification.

Referring now to FIGS. 8, 9 and 10, there are provided further modifications. The pallet of these embodiments is formed with but two sheets of thermoplastic material and the reinforcing member of the type utilized in the previous embodiment. The cross-sectional appearance of the embodiment of FIG. 10 as taken through line 8A—8A is the same as the embodiment of FIG. 9 taken through line 8—8. In such embodiments, the pallets are provided with a top panel member 43 which is substantially planar throughout and a lower plastic member 44. The lower member 44 is a molded unit having a plurality of deep grooves 45 formed therein which cooperate to define feet 46. The feet 46 thus function as supporting elements. As desired, the feet or supporting elements 46 may be interrupted as illustrated in FIG. 9 or may extend the entire width of the pallet as shown in FIG. 10. As will be obvious, the lifting forks are accommodated in the grooves 45. Thus, it will be obvious that the pallet as illustrated in FIG. 10 in which the feet 46 or supporting elements extend the full width of the pallet is limited to entry from only two of the four sides while the pallet illustrated in FIG. 9 has four-way entry. As with the previous embodiments, a reinforcing member 15 is positioned between the top panel member 43 an the lower plastic member 44.

Figure 11:
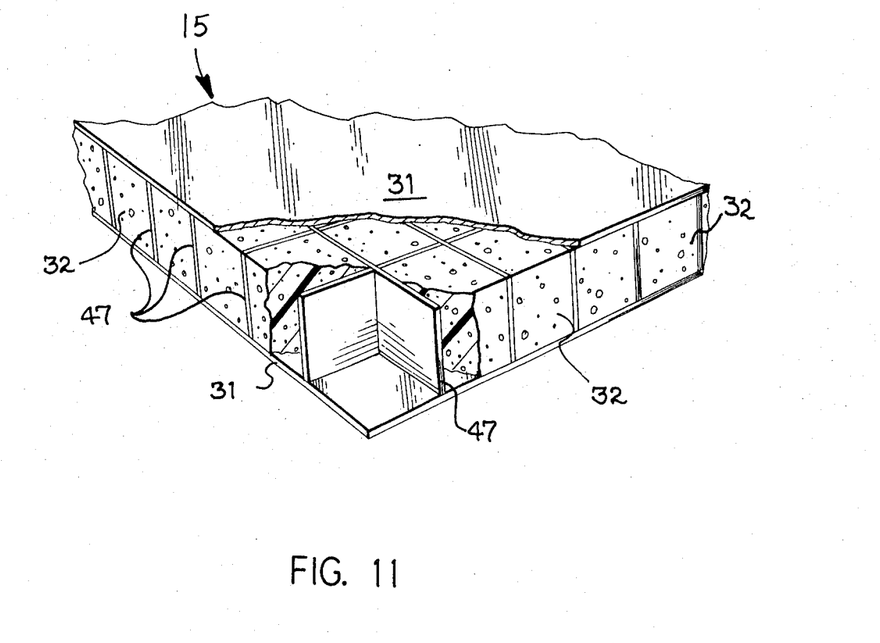
FIG. 11 is a perspective view, partly in section, of a modified reinforcing member.

Referring now to FIG. 11, there is illustrated a modified reinforcing member 15 in which there is provided in addition to the facing sheets 31 and filler 32 a plurality of reinforcing strips 47 positioned at right angles to the plane of the facing sheets 31. Such strips 47 serve to strengthen the reinforcing member and may be utilized when exceptionally high strength is required for the pallet. The reinforcing strips may be formed of material having similar strength characteristics as the facing sheets.

Figure 12:
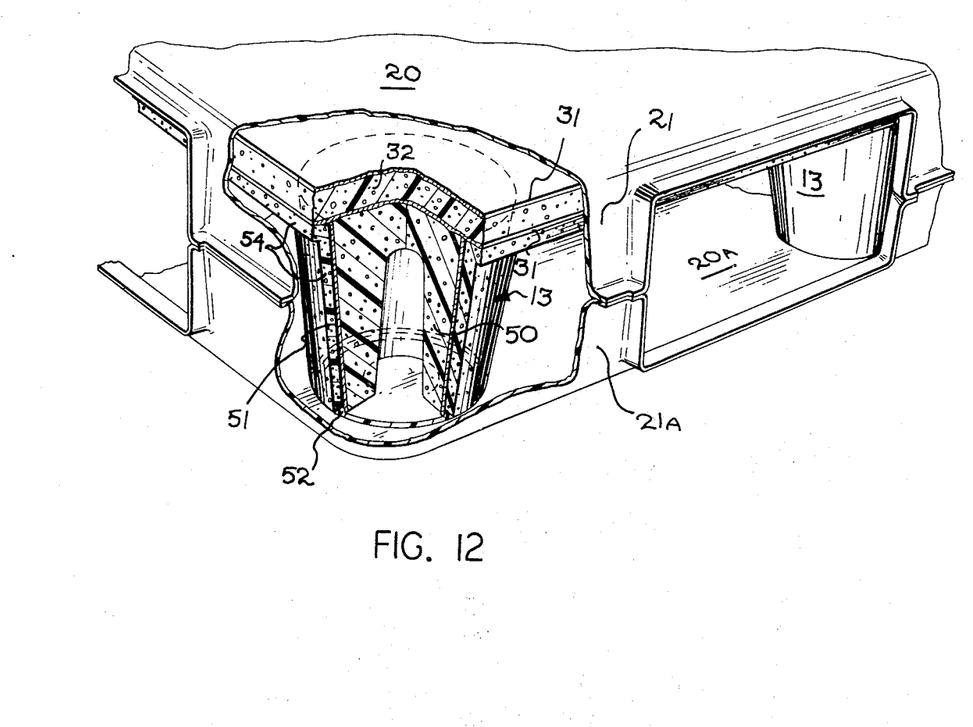
FIG. 12 is an enlarged fragmentary perspective view of another embodiment.

Referring now to FIG. 12, there is illustrated a further modification in which the supporting elements 13 comprise columns formed of molded foamed plastic 50, such as expanded polystyrene, encircled by a sleeve 51 formed of metal, fiberboard or other suitable material. Preferably, the sleeve 51 is adhered to the lower facing sheet 31. If desired, an upstanding annular flange 52 may be formed on the inner surface of the lower sheet 20A to receive and retain such columns in a fixed position. Additionally, if desired, the reinforcing member 15 and the sleeve 51 may be completely encapsulated in foam plastic as indicated by the numeral 54.

Figure 13:
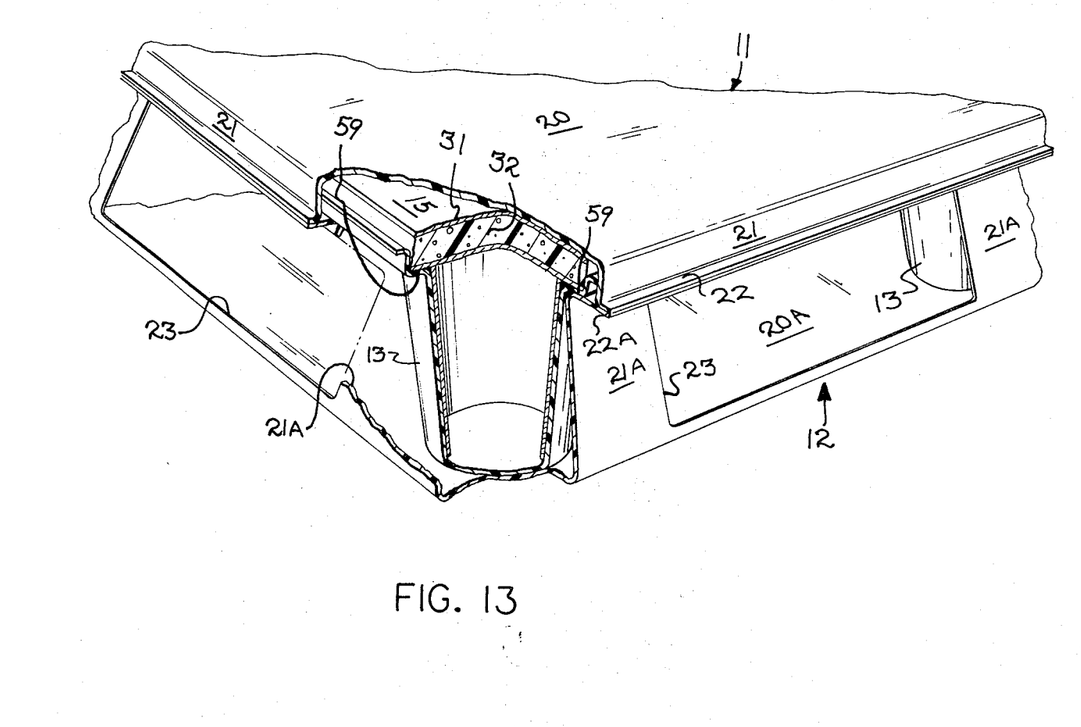
FIG. 13 is an enlarged fragmentary view of a further embodiment.

Referring now to FIG. 13, a pallet is provided which can either be hoisted by a sling type lift or lifted by a fork lift. Under the embodiment of FIG. 13, the peripheral edge portion 12A of the lower member 12 is substantially longer than the peripheral edge portion 21 of the upper member 11 and is offset inwardly therefrom. Thus, the flange 22A of the lower member 12 is longer than the flange 22 of the upper member 11 and is sufficiently wide to be supportingly engaged by the rope of cable of a sling type lift. The peripheral edge portion 21A is also provided with apertures 23 for receiving lifting forks.

Under this embodiment, the outer periphery of the intermediate member 14 rests on the upper surface of flange 22A as indicated by the numeral 59. Thus, the intermediate member 14 is supported both by the column-type supporting elements 13 and the peripheral edge portion 21A of the lower member 12.

The pallet of the present invention is particularly well-suited where it is desired to be used for rack loading or the like where it is supported only at spaced apart areas as by edge supports along the sides.

For a pallet designed to withstand compression loading only as where the entire surface of the bottom rests on a support or rack of the supporting elements rests directly on a support, it is possible that the reinforcing member have only the filler portion without the facing sheets of high tensile strength and Young's modulus. Such pallet obviously will not be able to support loads as great as those supported by a pallet in which the reinforcing member has the facing sheets; however, it is sufficient for many applications.

It can be seen from the foregoing description and the various embodiments that the present invention provides a pallet which can be easily and economically molded, using selections of material to best advantage, thus providing a pallet which is economical and yet which can carry the required loads.

What is claimed is:

1. A pallet comprising a lower sheet of thermoplastic material, a plurality of rows of supporting elements extending upwardly from the lowermost portion of said lower sheet, said supporting elements supporting thereon a reinforcing member, said reinforcing member including a pair of facing sheets having a filler element and an upper sheet of thermoplastic material engaging said reinforcing member and serving as a support member for loads positioned thereon, and wherein said lower sheet of the thermoplastic material is bonded to said upper sheet, a reinforcing element positioned in cooperative relationship with each of said supporting elements.

2. The pallet as defined in claim 1 further including a plurality of upstanding annular flanges formed integrally with said first sheet of thermoplastic material, said flanges positioned to receive and retain the lower end of said columns.

3. The pallet as defined in claim 1 wherein said columns are formed in a third sheet of thermoplastic material, said third sheet having a major planar portion on which said reinforcing member rests.

4. The pallet as defined in claim 1 wherein said columns are defined by cup-shaped pockets formed in third and fourth sheets of thermoplastic material, said third and fourth sheets being joined together with the cup-shaped pockets of one aligned with the cup-shaped pockets of the other.

* * * * *